US010035949B2

(12) United States Patent
Gill et al.

(10) Patent No.: US 10,035,949 B2
(45) Date of Patent: *Jul. 31, 2018

(54) FLUORO-INORGANICS FOR WELL CLEANING AND REJUVENATION

(71) Applicant: Ecolab USA Inc., St. Paul, MN (US)

(72) Inventors: Jasbir S. Gill, Naperville, IL (US); Anthony G. Sommese, Wheaton, IL (US); Thomas M. Miller, Aurora, IL (US); David Rodman, Townsville (AU)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,002

(22) Filed: Aug. 16, 2016

(65) Prior Publication Data
US 2017/0051198 A1  Feb. 23, 2017

Related U.S. Application Data

(60) Provisional application No. 62/206,669, filed on Aug. 18, 2015.

(51) Int. Cl.
C09K 8/72 (2006.01)
C09K 8/528 (2006.01)
E21B 43/26 (2006.01)

(52) U.S. Cl.
CPC ............... *C09K 8/72* (2013.01); *C09K 8/528* (2013.01); *C09K 2208/32* (2013.01); *E21B 43/26* (2013.01)

(58) Field of Classification Search
CPC . C09K 8/72; C09K 8/528; C09K 8/58; C09K 2208/30; E21B 43/26; E21B 43/16
USPC ........................................................ 166/307
See application file for complete search history.

(56) References Cited

U.S. PATENT DOCUMENTS

| | | | |
|---|---|---|---|
| 4,949,743 A | 8/1990 | Broom | |
| 6,815,404 B2 | 11/2004 | Becker | |
| 7,029,553 B1 | 4/2006 | Williams et al. | |
| 7,658,805 B2 | 2/2010 | Netherton | |
| 7,828,908 B1 | 11/2010 | Miralles | |
| 8,034,253 B2 | 10/2011 | Monzyk et al. | |
| 8,093,197 B2 | 1/2012 | Artiga-Gonzalez et al. | |
| 8,252,122 B2 | 8/2012 | Haake et al. | |
| 8,389,453 B2 | 3/2013 | Thomson | |
| 8,398,781 B2 | 3/2013 | Herdt et al. | |
| 8,598,094 B2* | 12/2013 | Welton | C09K 8/528 507/117 |
| 8,758,520 B2 | 6/2014 | Monsrud et al. | |
| 8,796,195 B2 | 8/2014 | Thomson | |
| 8,986,418 B1 | 3/2015 | Miller et al. | |
| 9,103,038 B2 | 8/2015 | Mohs et al. | |
| 9,562,188 B2* | 2/2017 | Monroe | C09K 8/524 |
| 2004/0033919 A1 | 2/2004 | Ruhr et al. | |
| 2005/0181966 A1 | 8/2005 | Micciche et al. | |
| 2005/0211274 A1 | 9/2005 | Jansen et al. | |
| 2006/0079424 A1 | 4/2006 | Perry | |
| 2008/0076840 A1 | 3/2008 | Flatt | |
| 2009/0176689 A1 | 7/2009 | Thomson | |
| 2009/0233819 A1 | 9/2009 | Fuller et al. | |
| 2009/0235730 A1 | 9/2009 | Alapati | |
| 2011/0079392 A1 | 4/2011 | Reyes | |
| 2012/0097392 A1 | 4/2012 | Reyes et al. | |
| 2012/0291818 A1 | 11/2012 | Monsrud et al. | |
| 2012/0325485 A1 | 12/2012 | Qu et al. | |
| 2013/0178405 A1 | 7/2013 | Thomson | |
| 2013/0192639 A1 | 8/2013 | Everson et al. | |
| 2014/0128294 A1 | 5/2014 | Gatlin et al. | |
| 2015/0005204 A1 | 1/2015 | Alwattari et al. | |
| 2015/0307788 A1 | 10/2015 | McDaniel et al. | |
| 2016/0060576 A1 | 3/2016 | Batton et al. | |
| 2016/0264844 A1 | 9/2016 | MacDonald, II | |
| 2016/0272879 A1 | 9/2016 | Reddy et al. | |

FOREIGN PATENT DOCUMENTS

| | | |
|---|---|---|
| RU | 2109805 C1 | 4/1988 |
| WO | 95/16006 | 6/1995 |
| WO | 00/32711 | 6/2000 |
| WO | 01/70922 A1 | 9/2001 |
| WO | 2006/013319 A1 | 2/2006 |
| WO | 2009/061487 A1 | 5/2009 |
| WO | 2009/121893 A1 | 10/2009 |
| WO | 2012/059714 A1 | 5/2012 |
| WO | 2014/004697 A2 | 1/2014 |
| WO | 2016/029089 A1 | 2/2016 |

OTHER PUBLICATIONS

International Search Report and Written Opinion dated Nov. 17, 2016 relating to PCT Patent Application No. PCT/US2016/047143, 14 pages.
International Search Report and Written Opinion dated Nov. 23, 2016 relating to PCT Patent Application No. PCT/US2016/047498, 17 pages.
Cao, Nahai et al., Wettability Alteration of Heavy-Oil-Bitumen-Containing Carbonates by Use of Solvents, High-pH Solutions, and Nano/Ionic Liquids, 2016 SPE Reservoir Evaluation & Engineering, OTC Brasil, Offshore Technology Conference, Rio de Janeiro, Brazil, Oct. 27-29, 2015, 9 pages.
Mohammed, Mohammedalmojtaba et al., Wettability alteration: A comprehensive review of materials/methods and testing the selected ones on heavy-oil containing oil-wet systems, Advances in Colloid and Interface Science 220 (2015) pp. 54-77.

(Continued)

Primary Examiner — Silvana C Runyan
(74) Attorney, Agent, or Firm — Senniger Powers LLP

(57) ABSTRACT

The present invention generally relates to methods for increasing recovery of crude oil from a subterranean hydrocarbon-containing formation and for removing or inhibiting deposits in a well, the methods comprising contacting an acid composition that comprises a salt of a nitrogen base having a fluoro inorganic anion with the well or the formation.

20 Claims, No Drawings

(56) References Cited

OTHER PUBLICATIONS

Sakthivel, Sivabalan et al., Use of Aromatic Ionic Liquids in the Reduction of Surface Phenomena of Crude Oil-Water System and their Synergism with Brine, Industrial & Engineering Chemistry Research, 2015, 54 (3), pp. 968-978.
Gallup, Darrell L., Investigations of organic inhibitors for silica scale control in geothermal brines, Geothermics 31 (2002) 415-430.
International Search Report dated Oct. 12, 2016 relating to PCT Patent Application No. PCT/US2016/040056, 7 pages.

* cited by examiner

FLUORO-INORGANICS FOR WELL CLEANING AND REJUVENATION

CROSS-REFERENCE TO RELATED APPLICATION

This application claims priority to U.S. Provisional Patent Application Ser. No. 62/206,669 filed on Aug. 18, 2015, the disclosure of which is incorporated herein by reference in its entirety.

FIELD OF THE INVENTION

The present invention generally relates to methods for increasing recovery of crude oil from a subterranean hydrocarbon-containing formation and for removing or inhibiting deposits in a well, the methods comprising contacting an acid composition that comprises a salt of a nitrogen base having a fluoro inorganic anion with the well or the formation.

BACKGROUND OF THE INVENTION

Within the petroleum industry, acids perform many functions, i.e. removing inorganic and organic scales, decarbonation, pH adjustment, general cleaning, and disinfecting; however, these acids can be highly dangerous to handle and transport, highly corrosive to metal surfaces, and can lead to the formation of mineral scales.

When crude oil production declines, there are a number of causes for the decline in production. Two reasons for a decline in oil production are (1) a reduction in the permeability of the oil "reservoir" or (2) the invasion of this reservoir by the water contained in a lower layer.

A reduction in permeability is typically due to the entrainment of fines, by the flow of the oil, towards the production well. Around this well, these particles accumulate and gradually plug the natural pores in the rock. The oil can then no longer flow out at an efficient rate through this well. These particles can be of various origins (e.g., type of rock, damage to the formation, progressive deterioration of the rock, etc.).

In order to remove these particles and improve the mobility of the oil in the formation, an acidic fluid can be injected into the well where some of the particles and some of the rock in the formation are partially soluble in this acidic fluid. Thus, this well stimulation method can cause these particles and rock to partially dissolve, and make the rock of the formation more porous thereby increasing the mobility of the oil in the formation and increasing well production.

A continuing need exists for alternative agents that are easier to handle, more environmentally benign, and have reduced corrosiveness.

SUMMARY OF THE INVENTION

One aspect of the invention is a method for increasing recovery of crude oil from a subterranean hydrocarbon-containing formation, the method comprising injecting an acid composition comprising a salt of a nitrogen base having a fluoro inorganic anion into a well which is in contact with the subterranean hydrocarbon-containing formation.

Another aspect of the invention is a method for increasing recovery of a geothermal fluid from a subterranean geothermal fluid-containing formation, the method comprising injecting an acid composition comprising a salt of a nitrogen base having a fluoro inorganic anion into a well which is in contact with the subterranean geothermal fluid-containing formation.

Yet another aspect of the invention is a method for removing an inorganic or organic deposit by contacting an acid composition with an internal surface of a well, the surface being in contact with a liquid containing deposit-forming species, wherein the acid solution comprises a salt of a nitrogen base having a fluoro inorganic anion.

Other objects and features will be in part apparent and in part pointed out hereinafter.

DESCRIPTION OF THE PREFERRED EMBODIMENTS

The present invention is directed towards methods for increasing recovery crude oil from a subterranean hydrocarbon-containing formation and for removing or inhibiting deposits in wells used for the production of oil and geothermal fluids. These methods use an acid composition comprising a salt of a nitrogen base having a fluoro inorganic anion. This acid composition is advantageous because it is capable of dissolving a variety of inorganic and organic deposits, is capable of reducing the pH in an aqueous environment, and is easier to handle than conventional acid compositions.

This method for removing heavy crude oils trapped in carbonate fields by injecting an acid composition generates carbon dioxide that helps lift the oil through the well. This treatment can also rejuvenate geothermal production and injection wells by contacting the well with an acid composition comprising a salt of a nitrogen base having a fluoro inorganic anion that removes various deposits and increases steam and electricity production.

Additionally, in sandstone formations, the methods described herein can restore or improve the natural formation permeability around the wellbore by removing formation damage, by dissolving material plugging the pores or by enlarging the pore spaces. Traditionally, this method involves using a solution generally composed of hydrochloric acid preflush, a main treating fluid (mixture of HCl and HF) and an overflush (weak acid solution or brine). The treating fluid is maintained under pressure inside the reservoir for a period of time, after which the well is swabbed and returned to production. Using the composition in this invention, the use of HCl and HF have been eliminated which are known corrosive acids.

Further, in carbonate formations, the methods described herein can create new, highly conductive channels (wormholes) that bypass damage.

These methods can be used for water flooding of carbonate fields. During this process, the formations yield water that is high in carbonate ions, which can interact with scaling cations like calcium, magnesium, strontium, and barium to form thick scales. Treating the produced water with an acid can form carbon dioxide and limit the scale formation. However, conventionally used acids are corrosive in nature and could cause corrosion problems in downstream unit operations. The methods disclosed herein can be used to liberate carbon dioxide without the corrosive side effect to downstream processing operations that conventional acids may exhibit.

Another aspect of the invention is a method for acid well-bore treatments; the treatment can help remove scale or similar deposits from perforations and well completion components. Conventionally, inhibited acids are used to reduce the corrosion rate; however, the corrosion rate can still be unacceptable. The methods described herein can remove the scale and similar deposits while exhibiting less corrosion than conventional acids, thus protecting the well. As detailed above, these methods can rejuvenate geothermal wells, water wells, deep injection wells, and production wells.

The acid composition comprises a salt of a nitrogen base having a fluoro inorganic anion.

The fluoro inorganic anion can comprise a borate ion, a phosphate ion, or a combination thereof. Preferably, the fluoro inorganic anion comprises a borate ion.

The fluoro inorganic anion can comprise tetrafluoroborate, hexafluorophosphate, or a combination thereof. Additionally, the hydrolysis products of tetrafluoroborate and hexafluorophosphate that contain fluorine atoms can also be used.

Preferably, the fluoro inorganic anion of the acid composition comprises tetrafluoroborate.

The acid compositions can have the fluoro inorganic anion comprise tetrafluoroborate and the nitrogen base comprise urea and the molar ratio of urea to tetrafluoroboric acid used to prepare the salt is 1:3 to 5:1, preferably 1:2 to 3:1. The nitrogen base (e.g., urea) can react with the fluoro inorganic acid (e.g., fluoroboric acid) to form the salt of a nitrogen base having a fluoro inorganic anion (e.g., urea tetrafluoroborate).

The concentration of the salt of a nitrogen base having a fluoro inorganic anion in the acid composition can be from about 5 wt. % to about 90 wt. %, from about 5 wt. % to about 80 wt. %, from about 5 wt. % to about 70 wt. %, from about 5 wt. % to about 60 wt. %, from about 15 wt. % to about 90 wt. %, from about 15 wt. % to about 80 wt. %, from about 15 wt. % to about 70 wt. %, from about 15 wt. % to about 60 wt. %, from about 25 wt. % to about 90 wt. %, from about 25 wt. % to about 80 wt. %, from about 25 wt. % to about 70 wt. %, from about 35 wt. % to about 90 wt. %, from about 35 wt. % to about 80 wt. %, from about 35 wt. % to about 70 wt. %, from about 50 wt. % to about 90 wt. %, from about 50 wt. % to about 80 wt. %, from about 50 wt. % to about 70 wt. %, from about 50 wt. % to about 60 wt. %, from about 60 wt. % to about 90 wt. %, from about 60 wt. % to about 80 wt. %, from about 60 wt. % to about 70 wt. %, from about 70 wt. % to about 90 wt. %, from about 70 wt. % to about 80 wt. %, or from about 70 wt. % to about 80 wt. %.

The concentration of the salt of a nitrogen base having a fluoro inorganic anion can be contacted with a subterranean formation or a well at a concentration from about 5 wt. % to about 30 wt. %, from about 5 wt. % to about 25 wt. %, from about 5 wt. % to about 20 wt. %, from about 5 wt. % to about 15 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 30 wt. %, from about 15 wt. % to about 25 wt. %, or from about 15 wt. % to about 20 wt. %, based on the total weight of the acid composition injected.

Preferably, the concentration of the acid composition is about 15 wt. % based on the total weight of the carrier fluid (e.g., aqueous mixture) that is being flushed into a well. After 24 to 36 hours of contact of the aqueous mixture with the well and formation, the mixture can then be pumped out of the well or formation.

For continuous acid treatment of a formation or well, the salt of a nitrogen base having a fluoro inorganic anion can contacted with the formation or well at a concentration from about 5 ppm to about 200 ppm, from about 5 ppm to about 150 ppm, from about 5 ppm to about 100 ppm, from about 10 ppm to about 200 ppm, from about 10 ppm to about 150 ppm, or from about 10 ppm to about 100 ppm, based on the total weight of the fluid being treated.

Further, the relative amounts and/or concentrations of the fluoro inorganic acid component and base component in the compositions of the present invention can vary widely, depending on the desired function of the composition and/or the required cleaning activity. As such, the weight ratios and/or concentrations utilized can be selected to achieve a composition and/or system having the desired cleaning and health and safety characteristics.

The nitrogen base can be urea, biuret, an alkyl urea, an alkanolamine, an alkylamine, a dialkylamine, a trialkylamine, an alkyltetramine, a polyamine, an acrylamide, a polyacrylamide, a vinyl pyrrolidone, a polyvinyl pyrrolidone, or a combination thereof.

The salt of a nitrogen base having a fluoro inorganic anion is disclosed in U.S. Pat. Nos. 8,389,453 and 8,796,195 and available commercially from Nalco-Champion as Product No. EC6697A.

The acid composition can further comprise water.

The acid composition can further comprise an organic acid. The organic acid can be formic acid, oxalic acid, citric acid, glutaric acid, or a combination thereof.

The method for cleaning the surface in contact with a liquid containing silica or silicates can be performed at a temperature from about 0° C. to about 374° C., from about 20° C. to about 320° C., or from about 40° C. to about 100° C.

In particular, the application of the composition can be in the cleaning and rejuvenation of wells which are used for the production of oil and geothermal fluids and reinjection of brine and general disposal wells.

The injected fluid can be, for example, water, brine (salt water), hydraulic fracture stimulation fluid (i.e. fracking fluid), acidizing additives, or any other type of aqueous fluid.

The acid composition can be injected into the formation during almost any stage in the life of the well, such as during drilling, completion, or stimulation. The acid compositions can be used in well stimulations methods to help increase permeability and improve production.

Additional additives typically used in hydraulic fracturing or used post-primary fracturing can be injected into the well, such as a viscosifying agent, a solvent, an alkali, a flow back aid, a non-emulsifier, a friction reducer, a breaker, a cross-linking agent, a biocide, or a proppant (e.g., sand). These additives typically are less than 1% of the fracturing fluid volume.

The subterranean hydrocarbon-containing formation or geothermal fluid-containing formation can comprise a sandstone reservoir or a carbonate reservoir.

The injection step of the methods of the invention can occur after hydraulic fracturing of the well.

The injection step of the methods of the invention can occur during hydraulic fracturing of the well.

The compositions of the present invention can be provided in conjunction with a fluid or an aqueous medium and can be provided in a ready-to-use form or can be provided as separate agents and the composition can be prepared at the site of the treatment. Depending on the nature of use and application, the composition can be in form of a concentrate containing a higher proportion the salt of nitrogen base having a fluoro inorganic anion, the concentrate being diluted with water or another solvent or liquid medium or other components such as the antifoaming agent, organic inhibitor of silica or silicate deposits, corrosion inhibitor, or surfactant before or during use. Such concentrates can be formulated to withstand storage for prolonged periods and then diluted with water in order to form preparations which remain homogeneous for a sufficient time to enable them to be applied by conventional methods. After dilution, such preparations may contain varying amounts of the cleaning composition, depending upon the intended purpose or end-use application.

The acid composition can further reduce corrosion of an internal surface of a piece of equipment used in a well as compared to the same method using a conventional acid composition (e.g., hydrochloric acid, hydrofluoric acid, sulfuric acid, etc.).

The acid composition can reduce metal loss from an internal surface of a piece of equipment used in a well as compared to the same method using a conventional acid composition (e.g., hydrochloric acid, hydrofluoric acid, sulfuric acid, etc.).

The methods described herein can have the acid composition be diverted toward a zone of the subterranean hydrocarbon-containing formation or geothermal fluid-containing formation that has a lower permeability to fluid than an adjacent zone.

The subterranean hydrocarbon-containing formation or geothermal fluid-containing formation can comprise a carbonate reservoir.

The methods described herein can be used in a well that is an oil well, a geothermal well, a disposal well, and a reinjection well.

The acid composition can further comprise a surfactant. Preferably, the surfactant is a nonionic surfactant.

The composition can further comprise one or more additional components including but not limited to a corrosion inhibitor, a solvent, an asphaltene inhibitor, an additional paraffin inhibitor, a scale inhibitor, an emulsifier, a dispersant, an emulsion breaker, a gas hydrate inhibitor, a biocide, a pH modifier, and a surfactant. A composition of the invention can comprise from 0 to 10 percent by weight of one or more of these additional components, based on total weight of the composition.

The acid composition can further comprise a corrosion inhibitor. When the acid composition comprises a corrosion inhibitor, the corrosion inhibitor is present in an amount as follows based on the total concentration of the aqueous mixture to be treated. Thus, the corrosion inhibitor can be used at a concentration of from about 1 ppm to about 1000 ppm, from about 1 ppm to about 800 ppm, from about 1 ppm to about 600 ppm, from about 1 ppm to about 500 ppm, from about 1 ppm to about 400 ppm, from about 1 ppm to about 200 ppm, from about 5 ppm to about 1000 ppm, from about 5 ppm to about 800 ppm, from about 5 ppm to about 600 ppm, from about 5 ppm to about 500 ppm, from about 5 ppm to about 400 ppm, or from about 5 ppm to about 200 ppm.

Preferably, the corrosion inhibitor is an imidazoline, a quaternary amine, a fatty acid, a phosphate ester, a carboxylic acid, an amine, a phosphate, a polyphosphate, a heavy metal, or a combination thereof.

Suitable corrosion inhibitors for inclusion in the compositions include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. For these quaternary salts, $R^{5a}$, $R^{6a}$, $R^{7a}$, and $R^{8a}$ are each independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, the like, and combinations thereof. The quaternary ammonium salt is an alkylamine benzyl quaternary ammonium salt, a benzyl triethanolamine quaternary ammonium salt, or a benzyl dimethylaminoethanolamine quaternary ammonium salt.

The corrosion inhibitor can be a quaternary ammonium or alkyl pyridinium quaternary salt such as those represented by the aeneral formula:

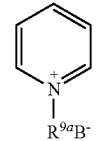

wherein $R^{9a}$ is an alkyl group, an aryl group, or an arylalkyl group, wherein said alkyl groups have from 1 to about 18 carbon atoms and B is Cl, Br or I. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. The corrosion inhibitor can include benzyl pyridinium chloride.

The corrosion inhibitor can also be an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of formula:

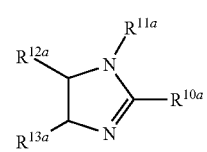

wherein $R^{12a}$ and $R^{13a}$ are independently a $C_1$-$C_6$ alkyl group or hydrogen, $R^{11a}$ is hydrogen, $C_1$-$C_6$ hydroxyalkyl, or $C_1$-$C_6$ arylalkyl, and $R^{10a}$ is a $C_1$-$C_{20}$ alkyl or a $C_1$-$C_{20}$ alkoxyalkyl group. Preferably, $R^{11a}$, $R^{12a}$ and $R^{13a}$ are each hydrogen and $R^{10a}$ is the alkyl mixture typical in tall oil fatty acid (TOFA).

The corrosion inhibitor compound can further be an imidazolinium compound of the following formula:

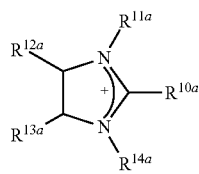

wherein $R^{12a}$ and $R^{13a}$ are independently a $C_1$-$C_6$ alkyl group or hydrogen, $R^{11a}$ and $R^{14a}$ are independently hydrogen, $C_1$-$C_6$ alkyl, $C_1$-$C_6$ hydroxyalkyl, or $C_1$-$C_6$ arylalkyl, and $R^{10}$ is a $C_1$-$C_{20}$ alkyl or a $C_1$-$C_{20}$ alkoxyalkyl group.

Suitable mono-, di-and trialkyl as well as alkylaryl phosphate esters and phosphate esters of mono, di, and triethanolamine typically contain between from 1 to about 18 carbon atoms. Preferred mono-, di-and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters. Alternatively, the phosphate ester may be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor compound can further be a monomeric or oligomeric fatty acid. Preferred are $C_{14}$-$C_{22}$ saturated and unsaturated fatty acids as well as dimer, trimer and oligomer products obtained by polymerizing one or more of such fatty acids.

The acid composition can also comprise a scale inhibitor. When the acid composition comprises a scale inhibitor, the scale inhibitor is present in an amount as follows based on the total concentration of the aqueous mixture to be treated. The scale inhibitor can be used at a concentration of from about 1 ppm to about 200 ppm, from about 1 ppm to about 150 ppm, from about 1 ppm to about 100 ppm, from about 1 ppm to about 50 ppm, from about 5 ppm to about 200 ppm, from about 5 ppm to about 150 ppm, from about 5 ppm to about 100 ppm, or from about 5 ppm to about 50 ppm.

Suitable scale inhibitors include, but are not limited to, phosphates, phosphate esters, phosphoric acids, phosphonates, phosphonic acids, polyacrylam ides, salts of acrylamido-methyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AMPS).

The acid composition can further comprise a chelating agent.

The chelating agent can be ethylene diamine tetraacetic acid (EDTA), 1-hydroxyethane 1,1-diphosponic acid (HEDP), a gluconate, or a combination thereof.

The methods for removing an inorganic or organic deposit in a well can remove deposits of a metal oxalate, a metal carbonate, a silicate, a metal sulfate, or a combination thereof.

Having described the invention in detail, it will be apparent that modifications and variations are possible without departing from the scope of the invention defined in the appended claims.

EXAMPLES

The following non-limiting examples are provided to further illustrate the present invention.

Example 1

Elemental Analysis of Deposits

The chemical composition of four deposits was determined by a standard composition analysis of X-ray fluorescence (XRF) for elemental composition, organics concentration by C/H/N/S elemental analysis, and the concentrations of organics/water of hydration and other volatile substances by heating to 925° C. for defined period of time. The results are shown in Table 3.

TABLE 3

Chemical composition of deposits.

| Chemistry | Deposit #1 | Deposit #2 | Deposit #3 | Deposit #4 |
|---|---|---|---|---|
| Silica (as $SiO_2$) | 56% | 49% | 56% | 51% |
| Calcium (as CaO) | 15% | 41% | 11% | 5% |
| Sodium (as $Na_2O$) | 4% | 5% | 7% | 3% |
| Aluminum ($Al_2O_3$) | <0.5% | <0.5% | 1% | 3% |
| Chlorine (as Cl) | 3% | <0.5% | 2% | not detected |
| Magnesium (as MgO) | 2% | 1% | 1% | 8% |
| Potassium (as $K_2O$) | <0.5% | <0.5% | 4% | 2% |
| Sulfur (as $SO_3$) | <0.5% | <0.5% | <0.5% | 2% |
| Iron (as $Fe_2O_3$) | <0.5% | <0.5% | 1% | <0.5% |
| Organics | <0.5% | <0.5% | 5% | 14% |
| Loss at 925° C.[a] | 20% | 2% | 17% | 25% |
| Application -> | Evaporator | Once-Thru HRSG | Evaporator | Evaporator |

[a]Likely due to water of hydration and also includes organics

Example 2

Dissolution of Materials

The test method consisted of weighing several grams (~3 g) of a standard solid into a 4 oz. plastic jar. Followed by the addition of 100 mL of distilled water. The test acids were prepared in 5, 10, or 15 wt. % product in distilled water. The cap to the jar was attached and the jar was shaken vigorously several times to completely wet the solid. If necessary, the cap was loosened to vent the build-up of pressure. During room temperature tests, the jars were shaken ~3 times per week (Method 1). During higher temperature tests, the jars were stored in a circulating water bath with an integral shaker (Method 2). Periodically, samples (3 mL) were taken at least one hour after shaking. The samples (2 g) were then syringe filtered through a 0.45μ filter. Filtered samples were then diluted with 98 mL of distilled water and submitted for solid composition analysis using X-ray fluorescence (XRF) and X-ray scattering (XRD) methods. Elemental analysis is presented in Tables 4-13.

The acids tested were urea tetrafluoroborate (commercially available from Nalco-Champion as Product No. EC6697A/R-50975, identified as composition A hereinafter), urea sulfate (commercially available from Vitech International, Inc. as A85, identified as composition B hereinafter), modified urea tetrafluoroborate (commercially available from Vitech International, Inc. as Product APW, identified as composition C hereinafter), urea hydrochloride (commercially available from Vitech International, Inc. as Product BJS-I, identified as composition D hereinafter), urea methanesulfonate (commercially available from Vitech International, Inc. as Product M5, identified as composition E hereinafter), urea tetrafluoroborate (commercially available from Vitech Internationally, Inc. as Product ALB), and modified urea hydrochloride (commercially available from Vitech International, Inc. as Product BJS-HT).

The solids tested were talc, amorphous magnesium silicate, aluminum oxide, magnesium oxide, calcium metasilicate, calcium fluoride, aluminum silicate, magnesium aluminum silicate, magnetite, manganese dioxide, calcium carbonate, barium carbonate, strontium carbonate, barium sulfate, and strontium sulfate.

TABLE 4

Dissolution of magnesium silicate hydroxide (talc) using 15 wt. % acid.

| Time | Element | Composition | | | | |
|------|---------|---|---|---|---|---|
|      |         | A | B | C | E | D |
| Method 1 | | | | | | |
| 7 days  | Mg as Mg   |      | 163  | 1664 | 75  | 97  |
|         | Si as SiO$_2$ |      | 191  | 4626 | 81  | 107 |
| 23 days | Mg as Mg   |      | 300  | 2390 | 123 | 171 |
|         | Si as SiO$_2$ |      | 240  | 6534 | 142 | 171 |
| 44 days | Mg as Mg   |      | 206  | 2676 | 338 | 216 |
|         | Si as SiO$_2$ |      | 134  | 7249 | 374 | 219 |
| 62 days | Mg as Mg   |      | 475  | 2929 | 208 | 253 |
|         | Si as SiO$_2$ |      | 271  | 7152 | 195 | 217 |
| Method 2 | | | | | | |
| 2 hours  | Mg as Mg   | 462  | 82   | 459  | 34  | 25  |
|          | Si as SiO$_2$ | 1248 | 80   | 1283 | 34  | 29  |
| 6 hours  | Mg as Mg   | 1332 | 227  | 1362 | 141 | 111 |
|          | Si as SiO$_2$ | 2693 | 197  | 2572 | 112 | 104 |
| 24 hours | Mg as Mg   | 2778 | 395  | 3410 | 280 | 251 |
|          | Si as SiO$_2$ | 5148 | 317  | 5251 | 280 | 299 |
| 48 hours | Mg as Mg   |      | 447  |      | 313 | 298 |
|          | Si as SiO$_2$ |      | 297  |      | 284 | 310 |

TABLE 5

Dissolution of magnesium silicate hydroxide (florisil) using 15 wt. % acid.

| Time | Element | Composition | | | | |
|------|---------|---|---|---|---|---|
|      |         | A | B | C | D | E |
| Method 1 | | | | | | |
| 7 days  | Mg as Mg   |      | 2688 | 2808 | 2777 | 2760 |
|         | Si as SiO$_2$ |      | 194  | 6824 | 121  | 133  |
| 23 days | Mg as Mg   |      | 2580 | 2523 | 2686 | 2651 |
|         | Si as SiO$_2$ |      | 99   | 6519 | 177  | 109  |

TABLE 5-continued

Dissolution of magnesium silicate hydroxide (florisil) using 15 wt. % acid.

| Time | Element | Composition | | | | |
|------|---------|---|---|---|---|---|
|      |         | A | B | C | D | E |
| Method 2 | | | | | | |
| 2 hours  | Mg as Mg   | 1640 | 1657 | 1526 | 1451 | 999  |
|          | Si as SiO$_2$ | 2480 | 119  | 3713 | 88   | 77   |
| 6 hours  | Mg as Mg   | 2104 | 2338 | 1990 | 2343 | 2213 |
|          | Si as SiO$_2$ | 3659 | 174  | 4440 | 147  | 155  |
| 24 hours | Mg as Mg   | 2103 | 2152 | 2093 | 2189 | 2136 |
|          | Si as SiO$_2$ | 5090 | 257  | 5322 | 261  | 270  |

[a] Values have units of mg/L.

TABLE 6

Dissolution of alumina using 15 wt. % acid.

| Time | Element | Composition | | | | |
|------|---------|---|---|---|---|---|
|      |         | A | B | C | D | E |
| Method 1 | | | | | | |
| 7 days  | Al as Al | 6556[a] | 269  | 5598  | 59  | 9   |
| 16 days | Al as Al | 15474   |      | 14107 |     |     |
| 37 days | Al as Al | 12361   | 3241 | 12193 |     |     |
| Method 2 | | | | | | |
| 6 hours  | Al as Al | 1414 | 692  | 1051 | 299  | 77  |
| 24 hours | Al as Al | 7233 | 3467 | 6236 | 1782 | 359 |
| 48 hours | Al as Al |      | 6519 |      | 3234 |     |

[a] Values have units of mg/L.

TABLE 7

Dissolution of magnesium oxide using 15 wt. % acid.
Method 1

| Time | Element | Composition | | | | |
|------|---------|---|---|---|---|---|
|      |         | A | B | C | D | E |
| 7 days  | Mg as Mg | 6952[a] | 17597 | 7150  | 11812 | 8334 |
| 16 days | Mg as Mg | 5562    | 18722 | 12281 | 14638 | 8786 |
| 37 days | Mg as Mg |         |       | 12101 |       |      |

[a] Values have units of mg/L.

TABLE 8

Dissolution of calcium metasilicate using 15 wt. % acid.

| Time | Element | Composition | | | | |
|------|---------|---|---|---|---|---|
|      |         | A | B | C | D | E |
| Method 1 | | | | | | |
| 2 days  | Ca as Ca   | 7909[a] | 665  | 9382 | 10197 | 9362 |
|         | Si as SiO$_2$ | 6925   | 2149 | 5635 | 1910  | 1102 |
| 16 days | Ca as Ca   | 8012   | 709  | 9131 | 10331 | 9893 |
|         | Si as SiO$_2$ | 8101   | 1053 | 6661 | 939   | 979  |
| 37 days | Ca as Ca   |        |      |      |       | 764  |
|         | Si as SiO$_2$ |        |      |      |       | 377  |
| Method 2 | | | | | | |
| 6 hours  | Ca as Ca   | 6380 | 1437 | 6017 | 4196 | 3303 |
|          | Si as SiO$_2$ | 5278 | 855  | 4191 | 438  | 271  |
| 24 hours | Ca as Ca   | 6448 | 1428 | 6754 | 8083 | 7337 |
|          | Si as SiO$_2$ | 5568 | 591  | 5375 | 364  | 293  |

TABLE 8-continued

Dissolution of calcium metasilicate using 15 wt. % acid.

|  |  | Composition | | | | |
|---|---|---|---|---|---|---|
| Time | Element | A | B | C | D | E |
| 48 hours | Ca as Ca | 6006 | 907 | 6017 | 7144 | 6507 |
|  | Si as SiO$_2$ | 6223 | 391 | 5026 | 356 | 246 |
|  | Method 3[b] | | | | | |
| 1 day | Ca as Ca | 920 | 1787 | 4569 | 4627 | 4453 |
|  | Si as SiO$_2$ | 406 | 64 | 783 | 3017 | 3709 |
| 3 days | Ca as Ca | 928 | 5351 | 6316 | 6681 | 5436 |
|  | Si as SiO$_2$ | 485 | 130 | 828 | 4260 | 4265 |

[a]Values have units of mg/L.
[b]Same as method 2, except temperature was set at 29° C.
Composition C and D were prepared as 5 wt. %.

TABLE 9

Dissolution of calcium fluoride using 15 wt. % acid.
Method 1

|  |  | Composition | | | | |
|---|---|---|---|---|---|---|
| Time | Element | A | B | C | D | E |
| 7 days | Ca | 988[a] | 1155 | 191 | 813 | 734 |
|  | F by ISE | 5875 | 1392 | 13673 | 1541 | 765 |
| 21 days | Ca | 878 | 994 | 232 | 758 | 717 |
|  | F by ISE | 350 | 1116 | 7755 | 1445 | 781 |
| 35 days | Ca | 766 | 860 | 251 | | |
|  | F by ISE | | | | | |

[a]Values have units of mg/L.

TABLE 10

Dissolution of aluminum silicate with 15 wt. % acid.

|  |  | Composition | | | | |
|---|---|---|---|---|---|---|
| Time | Element | A | B | C | D | E |
|  | Method 1 | | | | | |
| 7 days | Al | 2323[a] | 56 | 2252 | 62 | 20 |
|  | Si as SiO$_2$ | 4545 | 117 | 4451 | 129 | 38 |
| 23 days | Al | 5114 | 174 | 5377 | 153 | 37 |
|  | Si as SiO$_2$ | 6299 | 313 | 6034 | 253 | 74 |
| 23 days | Al | 6334 |  | 6033 | | |
|  | Si as SiO$_2$ | 7244 |  | 6038 | | |
|  | Method 2 | | | | | |
| 6 hours | Al | 2162 | 57 | 2335 | 29 | 26 |
|  | Si as SiO$_2$ | 1247 | 111 | 3040 | 59 | 50 |
| 24 hours | Al | 4803 | 236 | 4738 | 95 | 78 |
|  | Si as SiO$_2$ | 2928 | 417 | 3245 | 210 | 167 |
|  | Method 3[b] | | | | | |
| 1 day | Al | 114 | 17 | 103 | 109 | 10 |
|  | Si as SiO$_2$ | 438 | 34 | 539 | 136 | 18 |
| 3 days | Al | 738 | 37 | 585 | 548 | 18 |
|  | Si as SiO$_2$ | 1413 | 72 | 1432 | 235 | 34 |

[a]Values have units of mg/L.
[b]Same as method 2, except temperature was set at 29° C.

TABLE 11

Dissolution of magnesium aluminum silicate with 15 wt. % acid.

|  |  | Composition | | | | |
|---|---|---|---|---|---|---|
| Time | Element | A | B | C | D | E |
|  | Method 1 | | | | | |
| 8 days | Al | 426[a] | 312 | 351 | 260 | 232 |
|  | Mg | 1451 | 1509 | 1365 | 1416 | 1386 |
|  | Si as SiO$_2$ | 5393 | 206 | 5302 | 243 | 143 |
| 21 days | Al | 605 | 425 | 519 | 368 | 304 |
|  | Mg | 1387 | 1509 | 1319 | 1411 | 1291 |
|  | Si as SiO$_2$ | 6667 | 250 | 6249 | 264 | 132 |
| 35 days | Al | 1153 |  | 871 | | |
|  | Mg | 1777 |  | 1637 | | |
|  | Si as SiO$_2$ | 8325 |  | 7864 | | |
|  | Method 2 | | | | | |
| 2 hours | Al | 573 |  | 429 | | |
|  | Mg | 1070 |  | 1106 | | |
|  | Si as SiO$_2$ | 4057 |  | 4304 | | |
| 6 hours | Al | 812 | 232 | 716 | 538 | 211 |
|  | Mg | 1046 | 846 | 1060 | 1137 | 913 |
|  | Si as SiO$_2$ | 3565 | 214 | 3548 | 580 | 305 |
| 24 hours | Al | 898 | 456 | 906 | 809 | 377 |
|  | Mg | 1182 | 1133 | 1184 | 1258 | 1154 |
|  | Si as SiO$_2$ | 4811 | 337 | 4553 | 467 | 388 |

[a]Values have units of mg/L.

TABLE 12

Dissolution of magnetite with 15 wt. % acid.

|  |  | Composition | | | | |
|---|---|---|---|---|---|---|
| Time | Element | A | B | C | D | E |
|  | Method 1 | | | | | |
| 7 days | Fe | 8565[a] | 11549 | 2996 | 4060 | 558 |
| 21 days | Fe | 12409 | 15214 | 1972 | 9329 | 1524 |
| 37 days | Fe | 16711 | 20504 | 2034 | 13725 | |
|  | Method 2 | | | | | |
| 6 hours | Fe | 2088 | 2209 | 1942 | 1536 | 884 |
| 24 hours | Fe | 8268 | 8069 | 3737 | 9599 | 3334 |
| 48 hours | Fe | 8405 | 13212 | 2210 | 9309 | 3441 |
|  | Method 3[b] | | | | | |
|  |  | A | A[c] | | | |
| 7 days | Fe | 10026 | 4162 | | | |
| 22 days | Fe | 9996 | 6054 | | | |

[a]Values have units of mg/L.
[b]Same as method 2, except temperature was set at 25° C.
[c]Composition was prepared at 5 wt. %.

TABLE 13

Dissolution of manganese dioxide with 15 wt. % acid.

|  |  | Composition | | | | |
|---|---|---|---|---|---|---|
| Time | Element | A | B | C | D | E |
|  | Method 1 | | | | | |
| 7 days | Al | 570[a] | 142 | 745 | 80 | 40 |
|  | Mn | 572 | 544 | 3009 | 759 | 186 |
|  | Si as SiO$_2$ | 667 | 69 | 548 | 44 | 37 |
| 21 days | Al | 517 | 208 | 610 | 119 | 50 |
|  | Mn | 920 | 947 | 5247 | 1333 | 290 |
|  | Si as SiO$_2$ | 521 | 81 | 529 | 53 | 46 |

TABLE 13-continued

Dissolution of manganese dioxide with 15 wt. % acid.

| Time | Element | Composition | | | | |
|---|---|---|---|---|---|---|
| | | A | B | C | D | E |
| Method 2 | | | | | | |
| 6 hours | Al | 431 | 161 | 264 | 316 | 49 |
| | Mn | 386 | 248 | 827 | 593 | 365 |
| | Si as $SiO_2$ | 541 | 47 | 297 | 108 | 31 |
| 24 hours | Al | 478 | 318 | 477 | 504 | 91 |
| | Mn | 1165 | 908 | 3699 | 1532 | 1072 |
| | Si as $SiO_2$ | 483 | 136 | 457 | 323 | 62 |
| 48 hours | Al | 505 | 395 | 545 | 596 | 130 |
| | Mn | 1337 | 1111 | 6494 | 2167 | 1129 |
| | Si as $SiO_2$ | 468 | 184 | 468 | 378 | 73 |

<sup>a</sup>Values have units of mg/L.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for increasing recovery of crude oil from a subterranean hydrocarbon-containing formation, the method comprising:
    injecting an acid composition comprising a salt of a nitrogen base having a fluoro inorganic anion into a well which is in contact with the subterranean hydrocarbon-containing formation.

2. The method of claim 1, wherein the acid composition is diverted toward a zone of the subterranean hydrocarbon-containing formation that has a lower permeability to fluid than an adjacent zone.

3. The method of claim 2, wherein the subterranean hydrocarbon-containing formation comprises a sandstone reservoir or a carbonate reservoir.

4. The method of claim 3, wherein the subterranean hydrocarbon-containing formation comprises a carbonate reservoir.

5. The method of claim 1, wherein the acid composition further comprises a surfactant.

6. The method of claim 5, wherein the surfactant is a nonionic surfactant.

7. The method of claim 1, wherein the fluoro inorganic anion comprises a borate ion, a phosphate ion, or a combination thereof.

8. The method of claim 7, wherein the fluoro inorganic anion is tetrafluoroborate, hexafluorophosphate, or a combination thereof.

9. The method of claim 8, wherein the fluoro inorganic anion comprises tetrafluoroborate.

10. The method of claim 1, wherein the nitrogen base is urea, biuret, an alkyl urea, an alkanolamine, an alkylamine, a dialkylamine, a trialkylamine, an alkyldiamine, an alkyltriamine, an alkyltetramine, a polyamine, an acrylamide, a polyacrylamide, a vinyl pyrollidone, a polyvinyl pyrollidone, or a combination thereof.

11. The method of claim 10, wherein the nitrogen base comprises urea.

12. The method of claim 1, wherein the fluoro inorganic anion comprises tetrafluoroborate and the nitrogen base comprises urea and the molar ratio of urea to tetrafluroboric acid used to prepare the salt is 1:3 to 3:1.

13. The method of claim 12, wherein the concentration of the acid composition is from about 5 wt. % to about 30 wt. % based on the total weight of the aqueous mixture injected.

14. A method for increasing recovery of a geothermal fluid from a subterranean geothermal fluid-containing formation, the method comprising:
    injecting an acid composition comprising a salt of a nitrogen base having a fluoro inorganic anion into a well which is in contact with the subterranean geothermal fluid-containing formation.

15. The method of claim 14, wherein the acid composition is diverted toward a zone of the subterranean geothermal fluid-containing formation that has a lower permeability to fluid than an adjacent zone.

16. The method of claim 15, wherein the subterranean geothermal fluid-containing formation comprises a sandstone reservoir or a carbonate reservoir.

17. The method of claim 16, wherein the subterranean geothermal fluid-containing formation comprises a carbonate reservoir.

18. A method for removing an inorganic or organic deposit by contacting an acid composition with an internal surface of a well, the surface being in contact with a liquid containing deposit-forming species,
    wherein the acid solution comprises a salt of a nitrogen base having a fluoro inorganic anion.

19. The method of claim 18, wherein the well is an oil well, a geothermal well, a disposal well, or a reinjection well.

20. The method of claim 18, wherein the deposit is a metal oxalate, a metal carbonate, a silicate, a metal sulfate, or a combination thereof.

* * * * *